United States Patent [19]

Tanaka et al.

[11] Patent Number: 4,616,219
[45] Date of Patent: Oct. 7, 1986

[54] CHARACTER GENERATING DEVICE

[75] Inventors: Atsuyuki Tanaka, Toyohashi; Shozo Kaieda, Okazaki; Masaaki Nishiyama, Toyokawa, all of Japan

[73] Assignee: Minolta Camera Kabushiki Kaisha, Osaka, Japan

[21] Appl. No.: 469,037

[22] Filed: Feb. 23, 1983

[30] Foreign Application Priority Data

Feb. 23, 1982 [JP] Japan ............................... 57-28274

[51] Int. Cl.[4] ............................................. G09G 1/00
[52] U.S. Cl. ................................. 340/724; 340/731; 340/749; 340/750
[58] Field of Search ............... 340/724, 750, 731, 749, 340/728, 735; 354/7

[56] References Cited
U.S. PATENT DOCUMENTS

| | | | |
|---|---|---|---|
| 3,754,229 | 8/1973 | Manber | 340/731 |
| 3,911,420 | 10/1975 | Lampson | 340/749 |
| 4,153,940 | 5/1979 | Grier et al. | 340/724 |
| 4,240,075 | 12/1980 | Bringol | 340/798 |
| 4,283,724 | 8/1981 | Edwards | 340/749 |
| 4,321,599 | 3/1982 | Yoshiba | 340/750 |
| 4,342,096 | 7/1982 | McDevitt | 340/750 |
| 4,435,703 | 3/1984 | Hunt et al. | 340/749 |

*Primary Examiner*—Gerald L. Brigance
*Assistant Examiner*—Jeffery A. Brier
*Attorney, Agent, or Firm*—Price, Gess & Ubell

[57] ABSTRACT

Disclosed herein is a character generating device of a raster scan system which comprises a region data storage means for storing display region data predetermined with respect to each of the character codes and a region counter which is set by the display region data. The region data storage means and the region counter are correlated with each other, whereby the dot output is counted by the region counter for generating a signal to output the next character when the count value reaches a set region datum value.

10 Claims, 6 Drawing Figures

CHARACTER GENERATING DEVICE

FIELD OF THE INVENTION

The present invention relates to a character generating device, and more particularly, to a system for controlling a display region of characters in a display unit such as a laser printer and a cathode-ray tube (CRT) display unit.

BACKGROUND OF THE INVENTION

In a character generating device such as a laser printer, characters formed by dot patterns are displayed by a raster scan method.

FIG. 1 shows a typical example of a conventional character generating device for use in a laser printer of the above type. The device comprises a counter 1 which receives dot clocks for counting the number of dots forming a part of a character to be displayed on one scanning line in the scanning direction (i.e., in the lateral direction) and a column counter 2 which receives a signal from the counter 1 to increase its output data by one count. A text buffer 3 formed by a RAM (random access memory) stores image data of respective characters included in one page in forms of character codes for generating character codes in response to signals from the column counter 2. The text buffer 3 can be optionally edited by software. The character codes may be formed by, e.g., ASCII (American Standard Code of Information Interchange) codes, and when a code for one character is represented by eight bits (one byte) and one page is formed of 80 characters by 80 rows, the memory size of the RAM is 6,400 bytes (6.4 kilo bytes). A character generator 4 functions to store dot pattern information of the display characters and respond to the character code from the text buffer 3 to generate the dot patterns of the corresponding characters. For example, when 128 sorts of characters, each of which is formed of 32 dots×32 dots, are stored, the memory size of the character generator 4 is 16,384 bytes (approximately 16 kilo bytes). By forming the character generator 4 by a RAM, a desirable sort of font can be down-loaded. A parallel/serial conversion circuit (PSC) 5 is formed by a register for controlling the dot pattern information for one character from the character generator 4 based on dot clocks and converting the same into display serial data in one raster. Numeral 6 indicates a printing head of a laser printer.

In explaining operation of the character generation device as shown in FIG. 1, it is assumed that the text buffer 3 stores the character codes in order of "w i d t ..." and the forefront address is 0000H. Consequently, the initial address number of the column counter 2 is 0000H. It is further assumed that the dot pattern for each character is formed by 32 dots×32 dots. Consequently, the number "32" is set in the counter 1 as the dot number for one character in the scanning direction.

The text buffer 3 receives an address signal "0000H" from the column counter 2 to output a character code for a character "w" corresponding to the address "0000H" toward the character generator 4, which in turn processes the received character code as an address signal to output the dot pattern for the character "w" toward the PSC 5. The PSC 5 outputs the dot pattern for the character "w" by the dot clocks in the unit of raster while the counter 1 counts the dot clocks to generate a borrow signal when it counts the set number of "32" so that the column counter 2 is operated by this borrow signal to increase the output of the address signal toward the text buffer 3 by one count to "0001H". By virtue of this, the text buffer 3 outputs the character code for the next character "i" toward the character generator 4, which in turn generates the dot pattern of the character "i" toward the PSC 5. Then the PSC 5 outputs the dot pattern of the character "i" for the period of 32 times of the dot clocks. Successively in a similar manner, the dot patterns of the characters "d", "t", ... are output respectively for the same period of the dot clocks, to be printed out by the printing head 6.

Since each of the characters thus printed out by the printer or displayed in the CRT display unit is, as shown in FIG. 2, fixed in a predetermined dot matrix (32 bits×32 bits in this case) to be displayed, the display characters cannot be evenly spaced due to the difference in character width of the character displayed in the direction of the rows, leading to inconvenience in reading out messages.

Accordingly, there is required what is called "fitting" in which the spaces between adjacent characters are varied with the sorts of the characters. Known conventional fitting methods are: (1) to store an image of one page in the unit of dots so as to change the spaces between the characters by software; (2) to store fitting data in addition to the respective character codes in the text buffer; and (3) to store fitting information in the character generator in addition to the character pattern information.

However, the first method (1) requires a buffer memory of large capacity. When, for example, the number of the dots per 1 mm is ten, memories of 6.24 mega bits (780 kilo bytes) are required for printing on an A4 size paper [(10 bits/mm×210 mm)×(10 bits/mm×297 mm)]. Also in the second method (2), the capacity of the text buffer should be made large. For example, when the number of the characters for one page is set as 80 characters/row×80 rows=6,400 characters while each character code and the fitting datum are respectively represented by eight bits and two bits, additional memories of 2 bits×6400=12.8 kilo bits (1.6 kilo bytes) are required due to the addition of the fitting datum. Besides, a two-bit fitting datum can merely carry out four kinds of fitting at the best. Since a general CRT display unit has small numbers of character-forming dots (e.g., 5 dots×7 dots), the number of the kinds of the fitting sizes may be small. However, since a laser printer has high dot resolution capacity and a large number of character-forming dots (e.g., 32 dots×32 dots), various width of characters may be subdividedly defined, requiring various kinds of fitting sizes. Effectuation of eight kinds of fitting sizes requires three-bit fitting data while effectuation of sixteen kinds of fitting sizes requires four-bit fitting data. Thus, with the method of the aforementioned item (2), the memory capacity of the text buffer is increased in proportion to the increase in the kinds of the fitting sizes. Further, for inputting the fitting values into the counter, a decoder is required to convert the fitting datum into the fitting values, and the construction of the decoder becomes complicated with an increase in the kinds of the fitting sizes.

In the third method, (3), further, the capacity of the character generator must be remarkably increased. FIG. 3 shows the most simplified circuit embodying this method contemplated by the present inventors, in which the character generator 4 stores fitting information in addition to various kinds of character information in a form as shown in FIG. 4. When, in this case, the character is formed by 32 dots×32 dots and the fitting datum is formed by two bits, the memory capacity must be increased by 32×2 bits with respect to one character. Therefore, when 256 sorts of characters are to be processed, 32×2×256=16,384 bits (2 kilo bytes) are required only for storing the fitting data. Likewise to the aforementioned method (2), the decoder 7 for converting the fitting datum to an actual fitting value is complicated and, further, the memory capacity of the character generator 4 is increased with the increase of the fitting sizes when various kinds of fitting sizes are required.

SUMMARY OF THE INVENTION

An essential object of the present invention is to provide a character generating device which can carry out various kinds of character fitting with a small memory capacity.

Another object of the present invention is to provide a character generating device which can be used for driving a character display unit such as a laser printer in which each character is formed by fine high resolution dot matrix with a small memory size for the fitting data.

A further object of the present invention is to provide a character generating device which enables the display of characters with a uniform space between adjacent characters with a small memory size for the fitting data.

According to one aspect of the present invention, there is provided a character generating device, in which fitting data is stored in a memory, means provided independently of a text buffer and of the character generator, and which receives a character code output from a text buffer in its address line to output a fitting datum (dot number) corresponding to that character, so as to change the clock period of a column counter by the datum.

The character generating device according to the present invention comprises a storage means for storing character codes, a character generator for generating information of dot patterns with respect to the character codes and a register for converting the dot patterns generated from the character generator into display serial data to be output therefrom, and the character generating device further includes a region data storage means for storing display region data which is predetermined with respect to each of the character codes and a region counter which is set by the display region data. The region data storage means and the region counter are so correlated with each other that a region datum corresponding to the generated character code is read out from the region data storage means and set in the region counter upon generation of the character code from the character code storage means whereby the dot output from the register is counted by the region counter for generating a signal to output the next character when the count value reaches a set region datum value.

Many other features, advantages and additional objects of the present invention will become manifest to those versed in the art upon making reference to the detailed description which follows and the accompanying sheets of drawings.

DESCRIPTION OF THE PREFERRED EMBODIMENT

Figure 1:
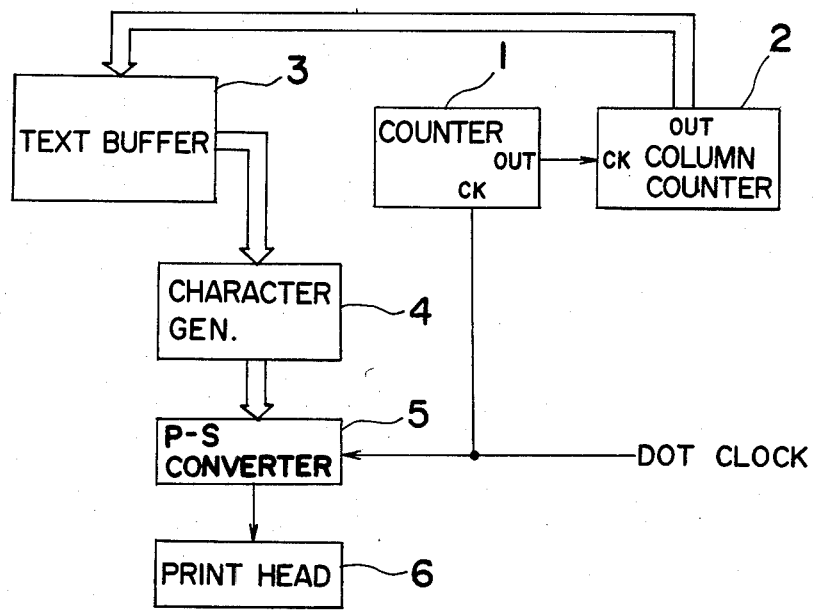
FIG. 1 is a block circuit diagram showing an example of a conventional character generation device.
Figure 5:
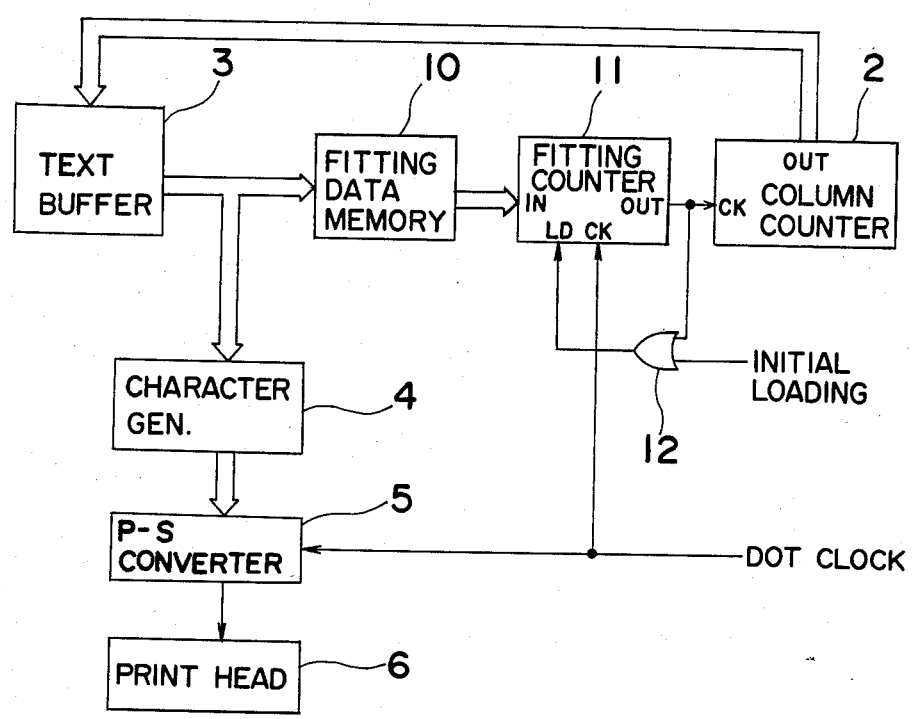
FIG. 5 is a block circuit diagram of an embodiment of a control system according to the present invention.

FIG. 5 shows a character generating device according to the present invention, which comprises a column counter 2, a text buffer 3 functioning as a character code storage means, a character generator 4, a PSC 5 formed by a register and a printing head 6 of a printer. Explanation of these components will be omitted as they are identical in construction and in function with the corresponding components shown in FIG. 1.

The device further includes a fitting data memory 10 for storing fitting data of characters and processing a character code signal received from the text buffer 3 as an address signal for outputting a fitting datum of the corresponding character and a fitting counter 11 for presetting the fitting datum from the fitting data memory 10 in the timing during which a load signal is produced to generate a borrow signal which is applied to the column counter 2 when the dot clock signal reaches the preset value. Reference numeral 12 indicates an OR circuit for inputting the load signal into the fitting counter 11.

Figure 2:
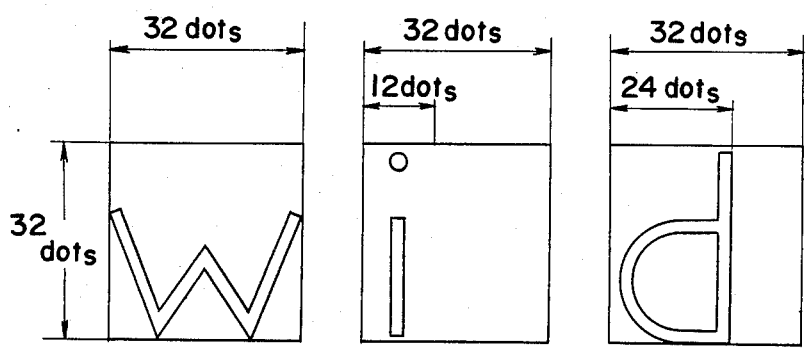
FIG. 2 is an illustrative view showing examples of character fonts stored in a character generator.
Figure 3:
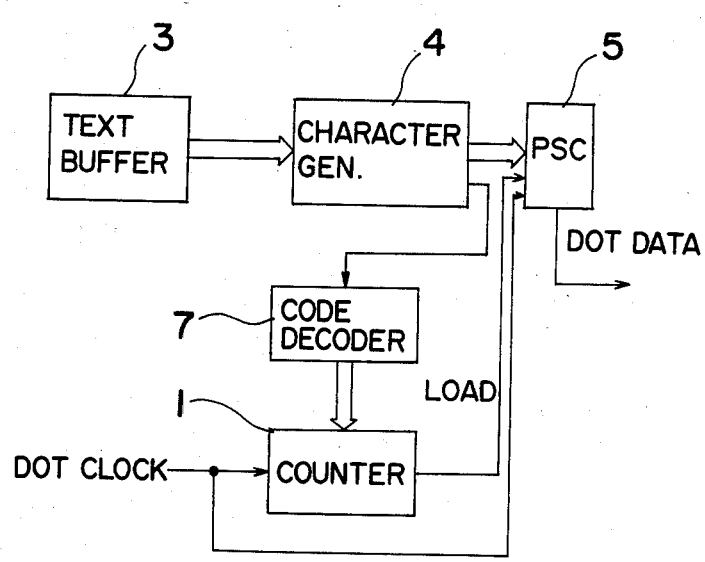
FIG. 3 is a block circuit diagram showing another example of a character generator.
Figure 4:
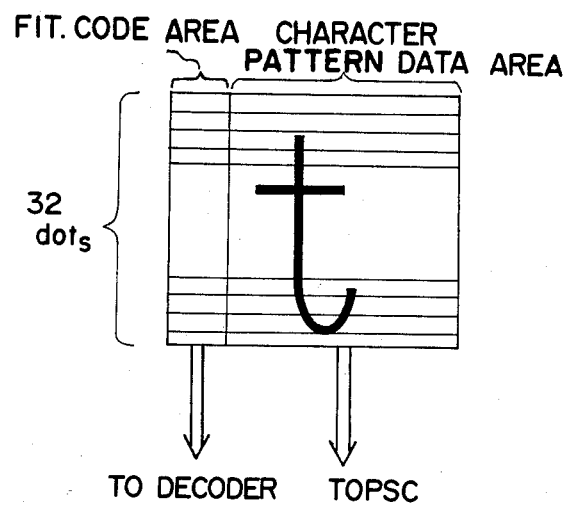
FIG. 4 is an illustrative view showing an example of fitting information stored in the character generator of FIG. 3.

In the embodiment as shown, the text buffer 3 stores characters in order of, e.g., "w i d t . . . " while the fitting data memory 10 stores fitting data "32, 12, 24, 16, . . . " corresponding to the characters "w i d t . . . ". Each of character fonts stored in the character generator 4 is defined as shown in FIG. 2. Each character is constructed by a dot matrix represented by 32 dots×32 dots at the largest and the image of a character is displayed in the left side in a region defined by the matrix. The fitting counter 11 is a down-count type counter.

Figure 6:
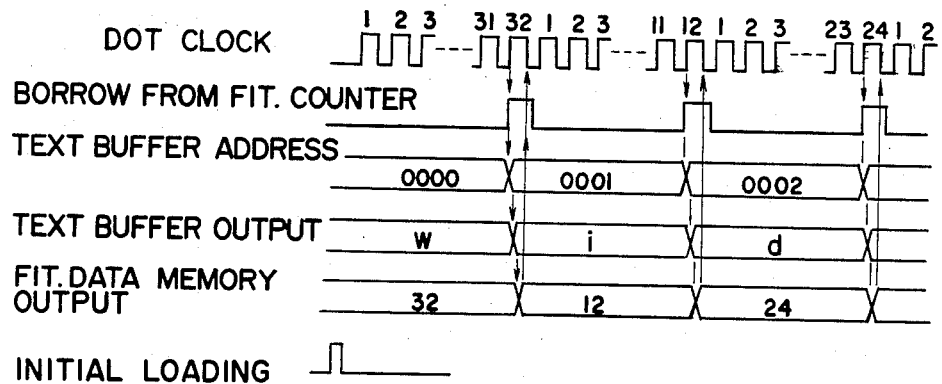
FIG. 6 is a waveform diagram illustrative of operation of the control system shown in FIG. 5.

As shown in FIG. 6, the column counter 2 generates an address signal "0000H" to the text buffer 3, which in turn outputs the character code of the character "w", which is received by the character generator 4 and by the address line of the fitting data memory 10. The character generator 4 generates a dot pattern of the character "w" which is applied to the PSC 5 in correspondence to the character code while the fitting data memory 10 simultaneously outputs a fitting datum representing "32" of the character "w" in correspondence to the character code. The fitting counter 11 receives the fitting datum "32" to preset the value of "32" by an initial load signal.

The PSC 5 outputs the dot pattern of the character "w" successively in the unit of the raster by dot clocks, and simultaneously, the fitting counter 11 is subtracted by the dot clocks to generate a borrow signal upon receiving the dot clocks thirty-two times. The column counter 2 is increased by the borrow signal, to generate an address signal "0001H" which is applied to the text buffer 3.

Then the text buffer 3 outputs a character code of the character "i" to be received by the character generator 4, which in turn outputs a dot pattern of the character "i" to be applied to the PSC 5 while the fitting data memory 10 receives the character code of the character "i", to output a fitting datum "12". This fitting datum "12" is loaded in the fitting counter 11 in synchronism with falling of the clock signal which is received during the presence of the borrow signal fed from the fitting counter 11 through the OR circuit 12, whereby the value in the fitting counter 11 is preset at "12", thereafter the borrow signal disappears. Then the PSC 5 successively outputs the dot pattern of a part of the character "i" by the dot clocks in the similar manner as above, and in this case the fitting counter 11 generates the borrow signal every time when twelve dot clocks are applied, so as to complete generation of the character "i". After completion of generation of the character "i", the next character "d" is generated for the period of twenty-four times of the dot clocks in a similar manner as decribed. The aforementioned operation is repeated to be processed for printing by the printing head 6.

The positions of characters thus printed or displayed in the aforementioned manner are adjusted in conformity with the respective character width, in which the character "w" is 32 dots wide, the character "i" is 12 dots wide and the character "d" is 24 dots wide.

Since the fitting data in the present invention is stored in an independently provided region data storage means such as the fitting data memory 10, the number of the fitting data to be memorized may be minimized conforming to the sorts of the characters to be used. For example, in a case where 128 characters are used and each fitting datum of the characters is represented by eight bits, the size of the memory required for the region data storage means is 128 bytes, which is extremely small in comparison with the size of the memory required in the conventional methods. The printer of the type as herein described will be necessarily improved to have a higher resolution capacity hereafter, and the device according to the present invention may well be adapted to a display unit in which each character is formed with high resolving degree without increasing the memory size of the region data storage means. For example, the conventional eight-bit memory can be adapted up to a resolution of 256 dots per character with the device according to the present invention.

According to the present invention, further, since the output from the region data storage means for fitting data itself represents the fitting size value, the fitting size can be desirably set in the unit of one dot without the necessity for any decoder as required in the aforementioned method of the aforementioned item (2).

It is advantageous that the number of the fitting data is not influenced by an increase in the number of the characters in the text buffer. Thus, according to the present invention, fitting may well be carried out with a small storage capacity, and subtly by the unit of the dot.

As many apparently widely different embodiments of this invention may be made without departing from the spirit and scope thereof, it is to be understood that the invention is not limited to the specific embodiments thereof except as defined in the appended claims.

What is claimed is:

1. A character generating device of a raster scan system comprising a character storage means for storing character codes, a character generator for generating information of dot patterns with respect to said character codes and a register for converting said dot patterns generated from said character generator into display serial data to be output therefrom, said character generating device further including:
    a region data storage means for storing display region data of a predetermined value with respect to each of said character codes, said region data storage means having a memory area for storing said region display data corresponding to each of the respective widths of character codes and being accessed by each of the character codes fed to the region data storage means from the character storage means so as to output said region display data corresponding to said character code, said character code being fed directly to the character generator and region data storage means simultaneously; and
    a region counter being set by said display region data;
    said region data storage means and said region counter being so correlated with each other that a region datum corresponding to the generated character code is read out from said region data storage means and set in said region counter upon generation of the character code from said character code storage means whereby the dot output from said register is counted by said region counter for generating a signal of output the next character when said count value reaches a set region datum value.

2. The character generating device as defined in claim 1, wherein a character code signal is used as a common address signal in a reading out operation of said region data storage means and in a generating operation of said character generator.

3. The character generating device as defined in claim 1, wherein said region counter is adapted to provide said region datum from said region data storage means in synchronism with falling of dot clock and a load signal.

4. The character generating device as defined in claim 3, wherein said load signal is given as an output signal of the region counter itself.

5. The character generating device as defined in claim 3, wherein said region counter is a down-count type counter and generated character fonts are formed in a respective matrix by a predetermined number of dots.

6. The character generating device as defined in claim 5, wherein said dot clock is used commonly for both a counting operation of said region counter and in an output operation of said register.

7. In a character generating device for combining character symbols of various widths to convey information to a user having a character storage means for storing individual character codes representative of each symbol, a character generator for generating the character symbols in response to the character codes, and means for combining the character symbols to form the desired information, the improvement comprising:
    memory means for only storing predetermined information indicative of the width of each character;
    means activated by generation of a character code representative of a character symbol to simultaneously generate predetermined width information of the character symbol in the form of a count value; and
    timing means, including means for generating a constant frequency clock signal and a counter capable of being set to the count value width information and responsive to the clock signal for initiating the start of the next adjacent character after the count value set in the counter has been reached by the clock signals.

8. The invention of claim 7 wherein the means for combining the character symbols includes a laser printing head.

9. The invention of claim 7 wherein the means for combining the character symbols includes a register that is responsive to the same clock signal as the counter.

10. A character generating device for combining character symbols of various widths to convey information to a user comprising:
   a storage means for storing character codes representative of character symbols;
   a character generator for generating information of patterns with respect to said character codes;
   means for combining the character symbols to form the desired information;
   a region data storage means for storing display region data of a predetermined value with respect to each of said character codes and producing a display region data signal;
   a region counter means, being set by said display region data signal to a count value, for generating a signal to output a successive character when the count value reaches a set region datum value. the region data storage means and the region counter means being so correlated with each other that a region datum corresponding to the generated character code is read out from the region data storage means and set in the region counter upon generation of the character code from the character code storage means; and
   timing means for generating a clock signal count to the region counter means.

* * * * *